United States Patent [19]

Amick et al.

[11] 4,455,402

[45] Jun. 19, 1984

[54] (METH)ACRYLATE FILM-FORMING POLYMERS PREPARED WITH AN IN PROCESS COALESCENT

[75] Inventors: David R. Amick, Chalfont; Sidney Melamed, Elkins Park; Ronald W. Novak, Chalfont, all of Pa.

[73] Assignee: Rohm and Haas Company, Philadelphia, Pa.

[21] Appl. No.: 455,763

[22] Filed: Jan. 5, 1983

[51] Int. Cl.³ .......................... C08K 5/05; C08K 5/10; C08F 265/06
[52] U.S. Cl. .................................. 524/295; 524/314; 524/306; 524/315; 524/317; 524/379; 524/385; 524/381; 524/460; 524/458; 524/366; 525/309; 525/266; 525/262

[58] Field of Search ............... 524/458, 460, 317, 379, 524/314, 295; 525/309, 262, 266

[56] References Cited

U.S. PATENT DOCUMENTS

| 3,651,175 | 3/1972 | Ide et al. | 525/309 |
|---|---|---|---|
| 3,678,133 | 7/1972 | Ryan | 525/309 |
| 4,150,005 | 4/1979 | Gehman | 525/460 |

Primary Examiner—Carman J. Seccuro
Attorney, Agent, or Firm—Michael B. Fein

[57] ABSTRACT

Two stage film-forming polymers having a soft first and a hard second stage are prepared by emulsion polymerizing the first stage and then, in the presence of a coalescent, the second stage. The polymers combine low MFT with superior early block resistance and high temperature hardness.

21 Claims, No Drawings

(METH)ACRYLATE FILM-FORMING POLYMERS PREPARED WITH AN IN PROCESS COALESCENT

BACKGROUND OF THE INVENTION

1. Field of the Invention

This invention relates to film-forming polymer emulsions and processes for producing such polymer emulsions.

2. Description of the Prior Art

Film-forming polymer emulsions having a soft first stage and hard final stage are well known; for example, see Victorius U.S. Pat. No. 3,454,516. The use of coalescent in the final formulation of film-forming polymers, for example in paints, lacquers, coatings, and the like, is also known.

Prior film-forming polymer emulsions provide good properties, but even further improvements in the balance between minimum filming temperature (MFT) and early block resistance/high temperature hardness had been desired. It is known that increasing $T_g$ increases early block resistance and high temperature hardness of polymeric films, but prior artisans were limited as to $T_g$ because of MFT, i.e., if the $T_g$ was increased, the polymer would not form a film at ambient temperature, unless undesirably high levels of coalescent were added. It has not been possible up to now to achieve ambient temperature film-forming and superior early block resistance and high temperature hardness from a polymer emulsion containing a low level of coalescent.

Summary of the Invention

It is therefore an object of the present invention to provide film-forming polymer emulsions which have low MFT, but form films having superior early block resistance and high temperature hardness; another object of the invention is to provide an improved process for producing these polymers. These objects and others as will become apparent from the following disclosure are achieved from the present invention which comprises in one aspect emulsion polymerizing a first, soft polymer and then emulsion polymerizing in the presence of this soft polymer and a coalescent a second, hard polymer, the weight ratio of the first, soft polymer to the second, hard polymer being about 35:65 to 65:35. In another aspect the invention comprises the two stage film-forming polymers thus produced which form films having low MFT and high early block resistance and high temperature hardness. The invention also comprises the dried film of the composition.

Detailed Description of the Invention and the Preferred Embodiments

The polymers provided herein are prepared by standard emulsion polymerization techniques wherein a latex is formed with water, soap, and initiator to cause latex polymerization of the monomers which are introduced.

As is usual in latex emulsion polymerization, initiators selected from ammonium persulfate, sodium persulfates, hydrogen peroxide and t-butyl peroxide, alone or as part of a redox couple are suitable. The soap can be an organic sulfate or sulfonate or an alkylated or acylated polyethylene oxide. Encyclopedia of Polymer Science and Technology, Vol. 5, "Emulsion Polymerization" p. 801, Interscience, New York, 1966.

The first stage polymer is produced from a selection of monomers which result in a soft polymer, usually having a glass transition temperature, $T_g$, of below 15° C. as measured by standard differential scanning calorimetric methods. Suitable monomers are the esters of acrylic and methacrylic acid, acrylonitrile, vinylidene chloride, vinyl acetate and styrene. The polymers also should contain a small amount of unsaturated acid such as acrylic acid or methacrylic acid. After polymerization of the first polymer, a coalescent is introduced and the second stage polymer, produced from a selection of monomers which result in a hard polymer is prepared in the presence of the first polymer and the coalescent.

The hard polymer used in this invention in a weight ratio of 65:35 to 35:65 to the first stage, and preferably 40:60, to 60:40 is prepared from monomers selected from the same group of monomers useful for the first stage; however, the monomers are chosen so as to have a measured $T_g$ of at least about 60° C. if polymerized separately, and preferably above 75° C., and more preferably above 80° C. While it is prefered to have a major part of acrylate, especially butyl acrylate, in the first stage monomer system, it is preferred to have a major part of methacrylate, especially methyl methacrylate, in the second stage polymer.

By coalescent we mean a solvent which is effective at keeping the second stage hard polymer rubbery under the conditions of polymerization. Suitable coalescents are selected from 3-hydroxy-2,2,4-trimethlypentyl isobutyrate (Texanol ®), 2-ethylhexanol, 2-butoxy ethanol, isopropanol, butanol, pine oil, butyl carbitol, butyl benzoate, diisopropyl adipate, dibutyl maleate, dibutyl fumarate, diisopropyl fumarate, diisopropyl maleate, 1,3-butanediol diisobutyrate, 1,3-butanediol diisoproprionate, di-n-propyl adipate, isopropyl benzoate, amyl butyrate, diisopropyl oxalate, butyl hexanoate, butyl butyrate, isoamyl butyrate, hexyl 2-ethylbutyrate, 2-ethlbutyl hexanoate, hexyl hexanoate, hexyl 2-ethylhexanoate, 2-ethylhexyl 2-ethylbutyrate, diisopropyl pimelate, and amyl benzoate. The preferred weight ratio of coalescents to second stage polymer is about 0.05 up to about 0.40.

In the film-forming polymer art, it is conventional to add coalescents after the completion of the film-forming polymer preparation. We refer to that as "post-added" coalescent. The function of post-added coalescent is to soften the film-forming polymer sufficiently to effect good film formation under the conditions of application. The in-process coalescent of the invention, however, is considerably more efficient at promoting film formation than is post-added coalescent.

It is quite surprising that with the addition of small amounts of coalescents prior to the polymerization of the second stage monomers, the amount of post-added coalescent to pass standard filming tests is markedly reduced. For example, in a system wherein at least 30 percent post-added coalescent was needed to pass a standard filming test, i.e., the formation of a crack-free film on a primed chart at 40° F. and 70% relative humidity, none was needed with the use of 10 percent in process coalescent. This polymer emulsion, containing only 10% coalescent (added in-process) was used to formulate a gloss paint which developed excellent flexibility, hardness, and block resistance under ambient conditions.

In another system wherein 40% post-added coalescent was not sufficient to pass a standard filming test, none was needed with the use of 15% in-process coalescent.

The film-forming polymers of the invention have a hard phase which becomes intermingled with the soft phase, rather than forming a "core-shell" polymer. Thus, the polymers behave like a soft film-forming polymer, but when the film forms, it appears to be a rubber film reinforced with hard polymer particles.

EXAMPLES

Example 1 - Comparative

A two stage film-forming polymer was prepared by a standard semi-continuous technique utilizing 0.4% sodium lauryl sulfate surfactant, 0.4% sodium persulfate initiator, a low level of adhesion promotor, and an 82° C. polymerization temperature. The first stage was a soft polymer having glass transition temperature $T_g$ of $-17°$ C. ($T_g$ is determined by differential scanning calorimetry), and having a monomer ratio of about 77 BA (butyl acrylate), 22 MMA (methyl methacrylate), and 1 MAA (methacrylic acid).

The second stage was a hard polymer having a measured $T_g$ of 82° C. and a monomer ratio of about 15 BA/84 MMA/1 MAA. The particle size was about 0.1 micron. The ratio of first to second stages was about 50:50.

The resultant two stage film forming polymer was subjected to a standard filming test to determine clear film formation on a primed chart at 40° F. and 70% relative humidity. The polymer failed the filming test until at least 30% Texanol ® coalescent (3-hydroxy-2,2,4-trimethylpentyl isobutyrate) was post-added.

Example 2 - Comparative

Example 1 was repeated, except with a soft to hard stage ratio of 55:45. Again, the post-addition of at least 30% of Texanol ® was necessary to pass the standard filming test.

Example 3

Example 1 was repeated except the second stage was polymerized in the presence of 10% Texanol ®; no post-added Texanol ® was needed to pass the standard filming test. Under ambient conditions a clear film developed a Tukon Hardness of 3.1 (1 week) and a print resistance (10 = best) at 140° F./1 hr/1 psi of 9 (1 week).

Example 4

Example 1 was repeated except the second stage was 99 MMA/1 MAA and had a measured $T_g$ of 105° C. Even with the post-addition of 40% Texanol ® the polymer failed the standard filming test.

Example 5

Example 4 was repeated except the second stage was polymerized in the presence of 15% Texanol ®; no post-added Texanol ® was needed to pass the standard filming test. Under ambient conditions a clear film developed a Tukon Hardness of 4 (1 week) and a print resistance (10 = best) at 176° F./1 hr/1 psi of 7 (1 week).

Example 6

The polymer emulsion of Example 3 was used to formulate a gloss paint (pigment volume concentration of 17.8% and volume solids of 31.9%) which developed excellent flexibility, hardness, and block resistance under ambient conditions:

Reverse Impact of $\geq$ 40 inch-pounds (1 week);
Tukon Hardness of 2.0 (1 week) and 3.1 (2 weeks);
Block Resistance (10 = best) at 120° F./30 min/2 psi of 8 (3 days) and 10 (1 week).

Example 7

Example 3 can be repeated, except with a first stage of 99 EA/1 MAA and a second stage of 20 EA/79 MMA/1 MMA, to give a latex with a low MFT which provides films that develop good hardness and print/block resistance under ambient conditions.

Example 8

Example 3 can be repeated, except with a first stage of 79 BA/20 styrene/1 MAA and a second stage of 10BA/89 styrene/1 MAA, to give a latex with a low MFT which provides films that develop good hardness and print/block resistance under ambient conditions.

Example 9

Example 3 can be repeated, except with a first stage of 78 BA/11 MMA/10 styrene/1 MAA and a second stage of 10 BA/45 MMA/44 styrene/1 MMA, to give a latex with a low MFT which provides films that develop good hardness and print/block resistance under ambient conditions.

Example 10

Example 3 can be repeated, except with a first stage of 62 2-ethylhexylacrylate/12 AN/22 styrene/4 MMA, and a second stage of 18 2-EHA/30 AN/48 styrene/4 MAA, to give a latex with a low MFT which provides films that develop good hardness and print/block resistance under ambient conditions.

We claim:

1. A process for producing sequentially fed two stage film forming polymers comprising emulsion polymerizing a first, soft polymer, and then emulsion polymerizing in the presence of the soft polymer and a coalescent a second, hard, polymer, the weight ratio of first, soft polymer to second, hard polymer being about 35:65 to 65:35, wherein said hard polymer, if polymerized separately, would have a $T_g$ of at least 25° C. and said soft polymer, if polymerized separately, would have a $T_g$ below 15° C. and wherein said soft polymer is polymerized from a monomer system containing at least one acrylate, and said hard polymer is polymerized from a monomer system containing at least one methacrylate.

2. A process in accordance with claim 1 wherein the weight ratio is 40:60 to 60:40.

3. Process in accordance with claim 1 wherein the $T_g$ of the hard polymer, if polymerized separately, is at least about 60° C.

4. Process in accordance with claim 3 wherein the $T_g$ is at least about 75° C.

5. Process in accordance with claim 3 wherein the $T_g$ is at least about 80° C.

6. Process of claim 1 wherein the soft and hard polymer are polymerized from one or more monomers selected from (meth)acrylates, acrylonitrile, vinylidene chloride, sytrene, and vinyl acetate.

7. Process of claim 1 wherein the soft polymer is polymerized from a monomer system comprising butyl acrylate.

8. Process of claim 1 wherein the hard polymer is polymerized from a monomer system comprising methyl methacrylate.

9. Process of claim 1 wherein the coalescent is selected from 3-hydroxy-2,2,4-trimethylpentyl isobutyrate, 2-ethylhexanol and 2-butoxy ethanol.

10. Process of claim 1 wherein the weight ratio of coalescent to hard polymer is about 0.05 to 0.40.

11. Process of claim 1 wherein an initiator selected from ammonium persulfate, sodium persulfate, hydrogen peroxide, and t-butyl peroxide, alone or as part of a redox couple, is used.

12. Process of claim 1 wherein a soap selected from organic sulfates, sulfonates, phosphates, and alkylated or acylated polyethylene oxides are used.

13. Composition comprising a two stage film forming polymer having a soft first stage and a hard second stage, having low MFT and early block resistance, being prepared in a two stage emulsion process according to claim 1 wherein the coalescent is selected from the group consisting of 3-hydroxy-2,2,4-trimethylpentyl isobutyrate, 2-ethylhexanol, 2-butoxy ethanol, isopropanol, butanol, pine oil, butyl carbitol, butyl benzoate, diisopropyl adipate, dibutyl maleate, dibutyl fumarate, diisopropyl fumarate, diisopropyl maleate, 1,3-butanediol diisobutyrate, 1,3-butanediol diisoprionate, di-n-propyl adipate, isopropyl benzoate, amyl butyrate, diisopropyl oxalate, butyl hexanoate, butyl butyrate, isoamyl butyrate, hexyl 2-ethylbutyrate, 2-ethylbutyl hexanoate, hexyl hexanoate, hexyl 2-ethylhexanoate, 2-ethylhexyl 2-ethylbutyrate, diisopropyl pimelate, and amyl benzoate.

14. Composition of claim 13 in the form of a latex dispersion.

15. A composition of claim 13 wherein the weight ratio is about 40:60 to 60:40.

16. Composition of claim 13 wherein the stages are polymerized from one or more monomers selected from (meth)acrylates, acrylonitrile, vinylidene chloride, sytrene, and vinyl acetate.

17. Composition of claim 13 wherein the soft stage is polymerized from butyl acrylate.

18. Composition of claim 13 wherein the hard stage is polymerized from methyl methacrylate.

19. Composition of claim 13 further including pigment.

20. Dried film comprising the composition of claim 13.

21. Dried film comprising the composition of claim 19.

* * * * *